(12) United States Patent
Tanner (10) Patent No.: US 7,620,848 B1
(45) Date of Patent: Nov. 17, 2009

(54) METHOD OF DIAGNOSING AND REPAIRING NETWORK DEVICES BASED ON SCENARIOS

(75) Inventor: David Tanner, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 826 days.

(21) Appl. No.: 10/723,929

(22) Filed: Nov. 25, 2003

(51) Int. Cl.
*G06F 11/00* (2006.01)

(52) U.S. Cl. .............................. 714/25; 714/26; 714/57; 709/224

(58) Field of Classification Search ................... 714/25, 714/26, 57; 706/45, 60, 61; 709/224
See application file for complete search history.

(56) References Cited

U.S. PATENT DOCUMENTS

| | | | |
|---|---|---|---|
| 5,333,308 A * | 7/1994 | Ananthanpillai | 714/4 |
| 5,483,637 A * | 1/1996 | Winokur et al. | 714/26 |
| 5,513,343 A * | 4/1996 | Sakano et al. | 714/26 |
| 5,864,563 A * | 1/1999 | Ratcliffe | 714/712 |
| 5,933,601 A * | 8/1999 | Fanshier et al. | 709/223 |
| 6,269,330 B1 * | 7/2001 | Cidon et al. | 714/43 |
| 6,618,823 B1 | 9/2003 | West | |
| 6,715,103 B1 * | 3/2004 | Nagai | 714/25 |
| 6,742,141 B1 | 5/2004 | Miller | |
| 6,874,099 B1 * | 3/2005 | Balasubramanian et al. | 714/4 |
| 6,968,371 B1 * | 11/2005 | Srinivasan | 709/223 |
| 6,970,873 B2 * | 11/2005 | Fu et al. | 707/100 |
| 7,017,080 B1 * | 3/2006 | Liggesmeyer et al. | 714/26 |
| 7,058,843 B2 * | 6/2006 | Wolf | 714/4 |

OTHER PUBLICATIONS

"Lightweight Directory Access Protocol." Microsoft Computer Dictionary, fifth edition, 2002.*

* cited by examiner

*Primary Examiner*—Robert Beausoliel
*Assistant Examiner*—Philip Guyton
(74) *Attorney, Agent, or Firm*—Hickman Palermo Truong & Becker LLP (57) ABSTRACT

A method and an apparatus are disclosed for diagnosing and repairing network devices based on scenarios. The method and apparatus aggregate responses to a selectable list of queries for a plurality of network scenarios that involve a plurality of applications on the network devices. In addition, the responses are automatically evaluated to formulate the appropriate corrective actions to address the scenarios for the applications.

30 Claims, 6 Drawing Sheets

METHOD OF DIAGNOSING AND REPAIRING NETWORK DEVICES BASED ON SCENARIOS

FIELD OF THE INVENTION

The present invention generally relates to management of computer networks. The invention relates more specifically to a method of diagnosing and repairing network devices based on scenarios.

BACKGROUND OF THE INVENTION

The methods described in this section could be practiced, but have not necessarily been previously conceived or pursued. Therefore, unless otherwise indicated herein, the methods described in this section are not prior art to the claims in this application and are not admitted to be prior art by inclusion in this section.

Computer networks that use routers, switches and other network elements are commonly managed using network management software systems. Examples of network management systems include Resource Management Essentials from Cisco Systems, Inc., San Jose, Calif., HP OpenView from Hewlett-Packard Company, Palo Alto, Calif., and others. Such network management systems are commonly used to support detection of network scenarios, including device faults, and to apply corrective instructions or configuration commands to network elements to address the scenarios.

One of the shortcomings of these network management software systems is the lack of guidance and automation for users of the systems. As a result, the network operator is required to know how to identify events that may represent symptoms of problems, how to determine whether symptoms actually represent the problems, how to diagnose the problems, how to select corrective action, and how to apply or perform the corrective action. In addition, the operator is also required to know the syntax of the commands and the usage of the commands in precise sequences to perform the aforementioned steps. All this knowledge that the operator mentally retains is neither easily transferable to another nor easily updateable to reflect platform or software changes.

Another shortcoming of these network management software systems is the primitive and proprietary interfaces of the systems. Specifically, many such systems support command line interfaces that accept character-based commands that conform to a complex grammar. In some cases, diagnosing faults requires the network operator to manually enter one command at a time. Numerous commands may be needed to determine a particular fault.

Also, each of these software systems is designed to handle a specific problem or scenario and has a distinct interface and feature set. As a result, the network operator is forced to learn multiple interfaces, feature sets, and subsequent updates or modifications to effectively manage multiple network scenarios.

Based on the foregoing, there is a clear need for improved network management methods or systems that overcome the stated drawbacks of the current systems. There is a need to flexibly and effectively manage multiple types of devices and respond to various network scenarios. There is also a need to aggregate and interpret relevant information from different network devices.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of an example network system that one embodiment of a method of diagnosing and repairing network devices based on scenarios operates in;

DETAILED DESCRIPTION

A method and apparatus for method of diagnosing and repairing network devices based on scenarios are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Throughout this description, a "network scenario" generally refers to a network condition that is outside the ordinary operation of the network. Some examples of a network scenario are, without limitation, a network device operational failure, a configuration failure, an application fault, and a connectivity failure. A "sequence of commands" generally refers one or more instructions or requests that together effectuate a desired operation. Instructions or requests may be command-line interface commands. For example, to properly restart a network device, a first command may be issued to diagnose the operating states of a network device; and if needed, a second command is issued that causes the network device to reset.

A "diagnosis" may comprise a sequence of commands and may result in a "pass" or "failure." A failed diagnosis is associated with at least one "error," one or more "possible causes," and a "repair action." The term "repair action" generally refers to one or more corrective actions that are performed in response to the identification of network scenarios. Some example repair actions may include, without limitation, creating a log entry, sending an email message, generating an alert, performing a configuration command or operation, executing a script, or recommending any of the foregoing actions.

Embodiments are described herein according to the following outline:

1.0 General Overview
2.0 Programmatic Scenario-based Network Device Management Approaches
   2.1 Example System Structures
      2.1.1 Example Network System
      2.1.2 Example Computer System
      2.1.3 Example Programmatic Scenario-based Network Device Management System
   2.2 Operation Flow
3.0 Example Extensions and Alternatives

1.0 GENERAL OVERVIEW

In one aspect, a method for diagnosing and repairing network devices based on scenarios is disclosed. The method includes aggregating responses to a selectable list of queries for a number of network scenarios from distinct applications on the network devices. The method further includes automatically evaluating the responses to formulate corrective actions to address the scenarios for the applications. To aggregate these responses, the method further includes filtering the responses according to a template and organizing the responses in a format that conforms to a format of the template.

According to an example feature, the method further includes presenting a number of items to a network operator. Some examples of these items are, without limitation, options to invoke corrective actions, options to customize such actions, the selectable list of queries, and options to modify such queries.

According to another example feature, the method further includes automatically establishing a sequence for the queries to be issued to the applications without interventions from the network operator. In yet another example feature, the method further includes detecting modifications to the network and automatically modifying the queries to match such modifications without the network operator interventions.

In other aspects, the invention encompasses a computer apparatus and a computer-readable medium configured to carry out the foregoing steps.

2.0 PROGRAMMATIC SCENARIO-BASED NETWORK DEVICE MANAGEMENT APPROACHES

2.1 Example System Structures 2.1.1 Example Network System

Figure 1:
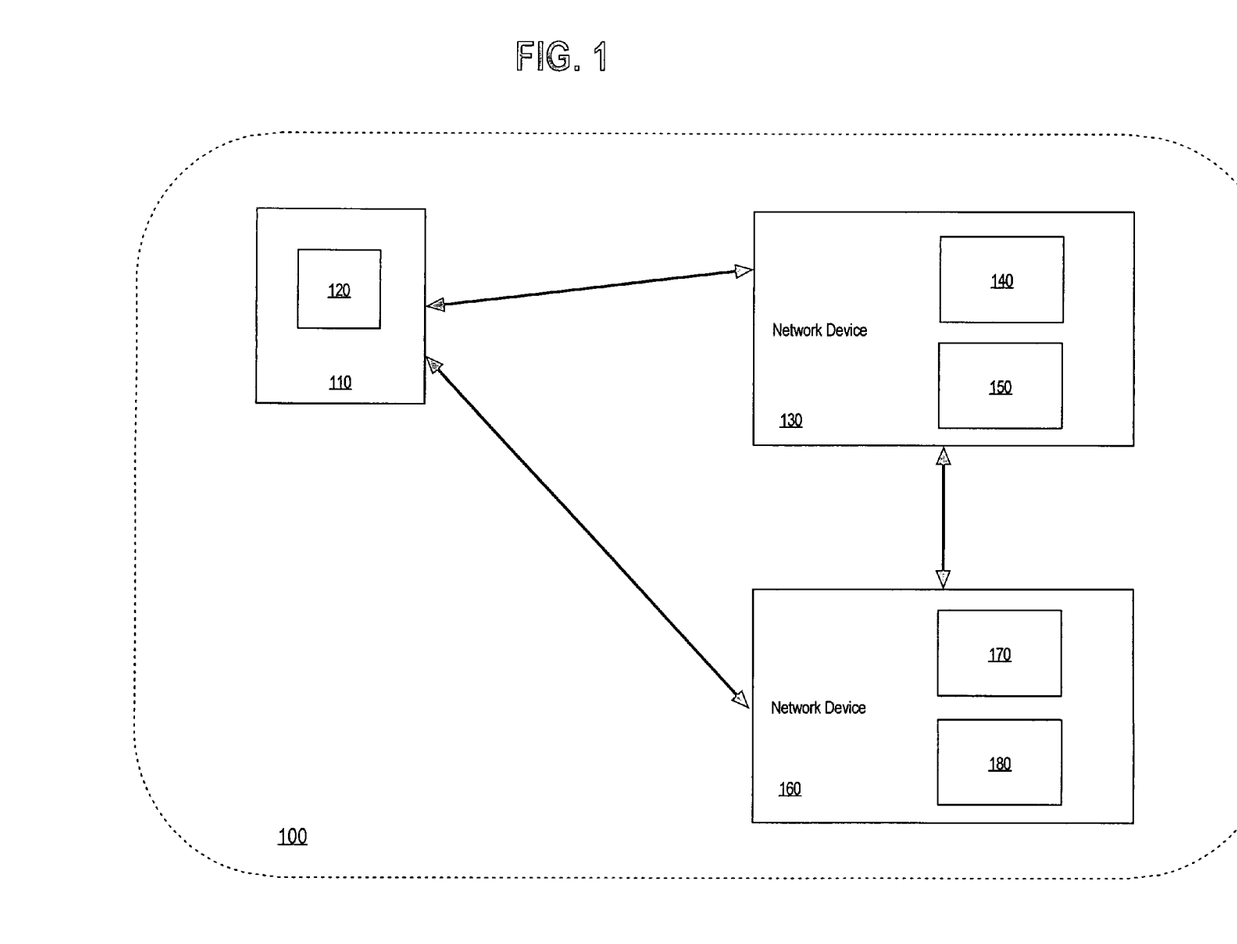

FIG. 1 is a block diagram of an example network system that one embodiment of a programmatic scenario-based network management system ("PSNMS") 120 operates in.

A network system 100 includes a client computer 110 and multiple network devices, such as a first network device 130 and a second network device 160. A network device can be a router, a switch, a bridge, a server, a terminal, or any other element connected to a network. For purposes of illustrating a clear example, two network devices 130, 160 are shown in network system 100, but in a practical embodiment there may be any number of network devices.

The client computer 110 and the network devices 130, 160 support multiple applications, such as the PSNMS 120 and applications 140, 150, 170, 180. Some examples of the applications are, without limitation, command parsers, utility programs, and device agents. One example embodiment of the PSNMS 120 communicates with and manages applications 140, 150, 170, 180 and provides a graphical user interface to an operator of the client computer 110. In addition, the PSNMS 120 is capable of remotely logging in one of the network devices, such as 130, and managing the other network devices, such as 140, from the logged in device. Specific details of the PSNMS 120 are discussed in subsequent paragraphs.

2.1.2 Example Computer System

Figure 2:
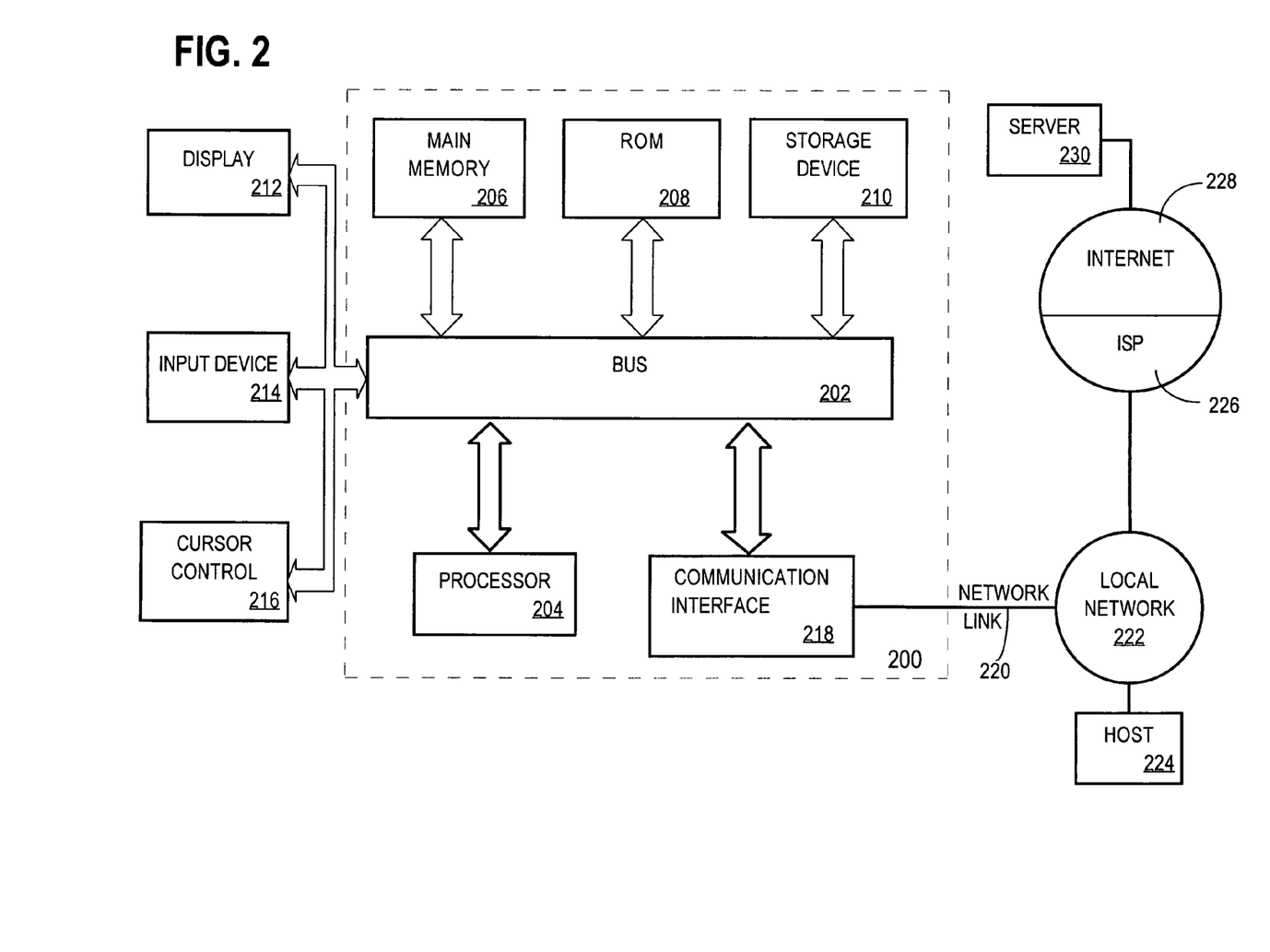
FIG. 2 is a block diagram of an example computer system upon which an embodiment of a method of diagnosing and repairing network devices based on scenarios may be implemented.

FIG. 2 is a block diagram of an example computer system for the client computer 110 upon which an embodiment of the PSNMS 120 may be implemented.

Computer system 200 includes a bus 202 or other communication mechanism to transfer information, and a processor 204 coupled with bus 202 to process information. The computer system 200 also includes a main memory 206, such as a random access memory ("RAM") or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory ("ROM") 208 or other static storage device coupled to bus 202 for storing static information and instructions for processor 204. A storage device 210, such as a magnetic disk or optical disk, is provided and coupled to bus 202 for storing information and instructions.

The computer system 200 may be coupled via the bus 202 to a display 212, such as a cathode ray tube ("CRT"), an active matrix display, a liquid crystal display, or other display technologies, for displaying information to a computer user. An input device 214, such as alphanumeric keyboards or voice recognition devices, is coupled to bus 202 for communicating information and command selections to processor 204. Another type of user input device is cursor control 216, such as a mouse, trackball, stylus, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

In one example embodiment, the processor 204 of the computer system 200 provides the functionality of the PSNMS 120 by executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the PSNMS 120.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector can receive the data carried in the infrared signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 may be an integrated services digital network ("ISDN") card or a modem to provide a data communication connection to a corresponding type of the network link 220. As another example, the communication interface 218 may be a local area network ("LAN") card to provide a data communication connection to a compatible LAN. Wireless links may also be implemented. In any such implementation, the communication interface 218 sends and receives electrical, electromagnetic or optical signals that carry digital data streams representing various types of information.

The network link 220 typically provides data communication through one or more networks to other data devices. For example, the network link 220 may provide a connection through the local network 222 to a host computer 224 or to data equipment operated by an Internet Service Provider ("ISP") 226. The ISP 226 in turn provides data communication services through the worldwide packet data communication network now commonly referred to as the "Internet" 228. The local network 222 and the Internet 228 both use electrical, electromagnetic or optical signals that carry digital data streams. The signals through the various networks and the signals on the network link 220 and through communication the interface 218, which carry the digital data to and from the computer system 200, are example forms of carrier waves transporting the information.

Computer system 200 can send messages and receive data, including program code, through the network(s), the network link 220 and the communication interface 218. In the Internet example, a server 230 might transmit a requested code for an application program through the Internet 228, the ISP 226, the local network 222 and the communication interface 218. In accordance with the invention, one such downloaded application provides for the functionality of the PSNMS 120 as described herein.

The received code may be executed by processor 204 as it is received, and/or stored in storage device 210, or other non-volatile storage for later execution. In this manner, the computer system 200 may obtain application code in the form of a carrier wave.

2.1.3 Example Programmatic Scenario-Based Network Management System

Figure 3:
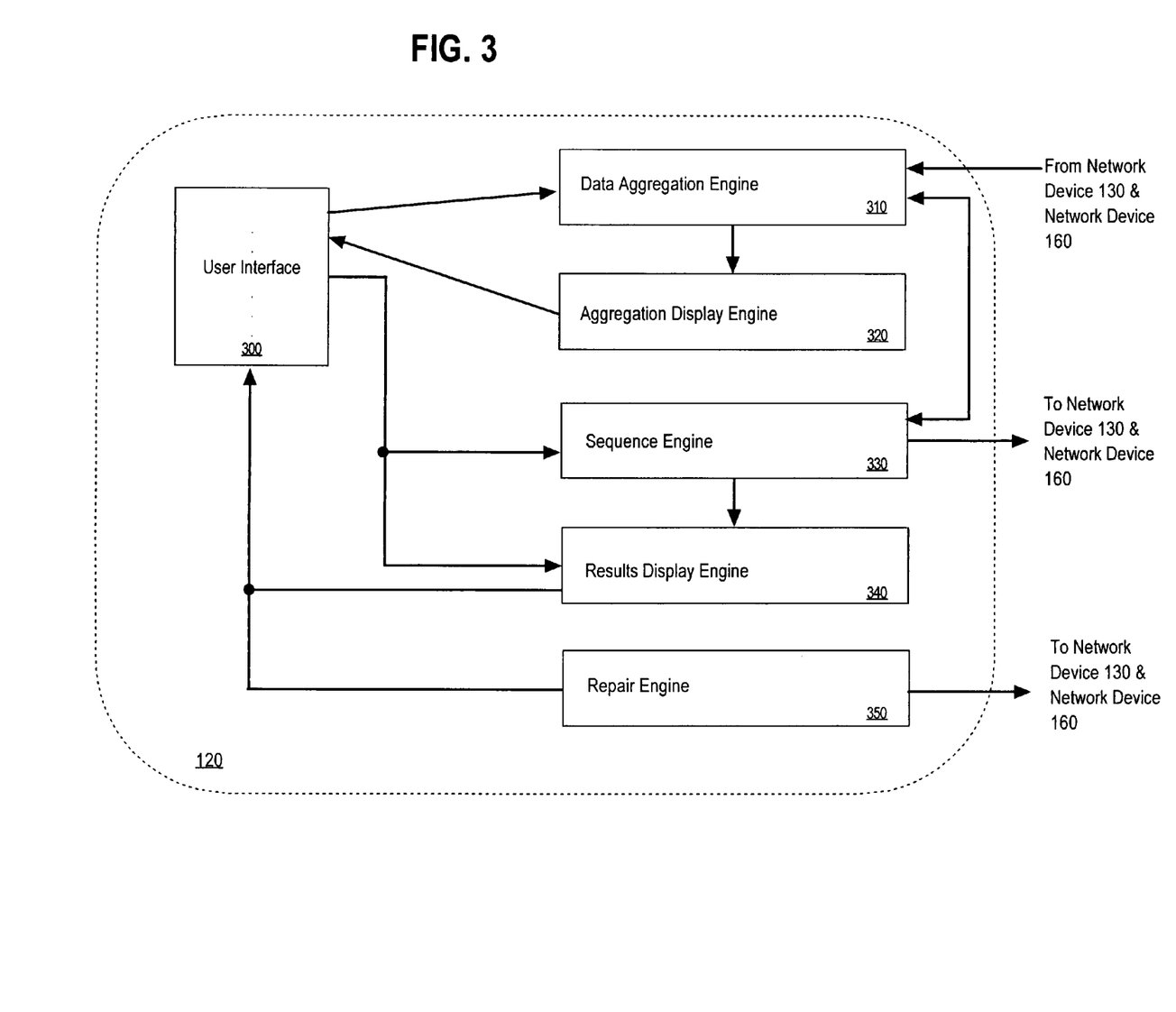
FIG. 3 is a block diagram of an example embodiment of a method of diagnosing and repairing network devices based on scenarios.

FIG. 3 is a block diagram of an example embodiment of a programmatic scenario-based network management system. In the example embodiment of FIG. 3, PSNMS 120 includes a user interface 300, a data aggregation engine 310, an aggregation display engine 320, a sequence engine 330, a results display engine 340, and a repair engine 350. An operator of client computer 110 may execute PSNMS 120 on the client computer to monitor and manage the network system 100.

User interface 300 allows the operator to easily select functions of, and view data generated by, the PSNMS 120. User interface 300 displays information that relates to various network scenarios. The information includes, for example, scenarios, sequence of tests to be performed to diagnose specified scenarios, data aggregation results, communication test results, errors, possible causes of errors, suggested repair actions, and repair results.

One embodiment of data aggregation engine 310 is configured for retrieving specific types of data from distinct applications of different network devices. For example, the data aggregation engine 310 can retrieve inventory information from the application 140 of the network device 130 and environment state information from the application 180 of the network device 160, and organize the information according to a specific template. In one embodiment, data aggregation engine 310 filters out information that is not part of the template and places the filtered information in a format that is consistent with the format of the template.

In one implementation, the data aggregation engine 310 has multiple templates to choose from. These templates can be generated according to the operator's specifications, patterns of the past retrieved data, configurations of the network, or other criteria. Table 1 illustrates some example characteristic information, or attributes, that the applications track or monitor and a template may include.

TABLE 1

EXAMPLE ATTRIBUTES

| Types of Applications | Attributes |
|---|---|
| Inventory tracker for a network device | Name (Object ID) |
| | Hardware and software revisions |
| | Model name |
| | Software state |
| | Memory size |
| | Card administration state |
| | Card operation state |
| | Card reset reason |
| | Time of the last operating state change |
| Alarm event tracker for a network device | Severity summary |
| | Date and time of alarm event occurrences |
| Monitoring an application interface for a network device | Administration and operational status |
| Monitoring of the operating environment of a network device | Alarm light emitting diodes ("LEDs") |
| | Temperature |
| | Voltage |
| | Fan Speed |

The data aggregation engine 310 then transfers the organized data to the aggregation display engine 320, which drives the user interface 300 to display the data.

One embodiment of sequence engine 330 is responsible for issuing queries, which may include sequences of commands, to the various applications of the network devices and analyzing the responses from the applications. In one implementation, an operator can select the queries for the sequence engine 330 to issue using the user interface 300. For instance, user interface 300 may provide the operator with a total of ten query choices, where each query represents a test for a particular network scenario. The operator may choose two out of the ten available tests and as a result cause the sequence engine 300 to issue the two selected queries, as opposed to all ten, to the appropriate applications.

Sequence engine 330 also automatically establishes an order in which different queries are issued. As an example, assume that PSNMS 120 detects a network device failure. In order to identify the cause of the error, PSNMS 120 needs to perform a test sequence A first, and then based on the results of that test, either perform a test sequence B or a test sequence C. Instead of presenting the test results to the operator and asking the operator to evaluate the test results and choose between the two test sequences, sequence engine 330 automatically issues either the test sequence B or the test sequence C based on the outcome of the test sequence A. Decision logic for selecting test sequence B or test sequence C may be hard-coded into PSNMS 120 or may be represented in an external data file or configuration file.

After identifying a failure, sequence engine 330 determines an error associated with the failure and corrective actions to repair the failure. In one embodiment, sequence engine 330 accesses a stored table or database that associates test failures with errors and repair actions. A particular test failure may be associated with one or more errors, and with one or more repair actions.

In one implementation, the sequence engine 330 sends the descriptions of the errors and repair actions to results display engine 340, which drives the user interface 300 to display the errors and repair actions for the operator. The operator may view the test results, errors and repair actions. The operator may elect to perform repair actions manually, or may instruct the system to perform the specified repair actions automatically. If the operator selects performing a particular repair action automatically, then the repair engine 350 is invoked to carry out the selected action. Table 2 illustrates some example network scenarios, sequences of commands, and the corresponding repair actions.

TABLE 2

EXAMPLE SCENARIOS, COMMANDS, REPAIR ACTIONS

| Network scenarios | Sequences of commands | Repair Action |
|---|---|---|
| Router Domain Name System ("DNS") Name Test | The PSNMS 120 sends a command to the router to verify the correctness of the DNS name of the router. | Provide proper DNS Name support for the router. |
| Router Ping Test | The PSNMS 120 sends an Internet Control Message Protocol ("ICMP") Ping command to the router to test the end-to-end connectivity. | Provide proper end-to-end network connectivity. |
| HyperText Transfer Protocol ("HTTP") Server Test | The PSNMS 120 sends a command to a HTTP server via the router to request documents from the server. | Either manually start the HTTP server or have the PSNMS 120 restart the server. |
| Common Object Request Broker Architecture ("CORBA") Services and Extensible Markup Language ("XML") Agent Tests | The PSNMS 120 sends commands to the CORBA services or the XML agent to establish communication. | (If failure, then go to the next set of commands) |
| | Log in to the router via PSNMS 120 and initiate: "Ping <Router DNS Name>" | Provide proper DNS Name support for the router or have the PSNMS 120 configure the Internet Protocol ("IP") host. |
| | The PSNMS 120 sends other commands to the CORBA services to verify whether certain processes for the services are running. | Manually start the processes manually or have the PSNMS 120 start the processes. |
| Notification Test | Log in to the router via PSNMS 120 and initiate: "Ping <Router DNS Name>" | (If failure, then go to the next set of commands) |
| | Log in to the router and initiate: "Ping <Client IP Address>" | If test passes: Manually start the processes for the CORBA services or have the PSNMS 120 configure the IP host. If test fails: Provide proper end-to-end network connectivity. |

As shown in Table 2, some repair actions include manual steps, such as manually restarting a device, but others are fully automated after selection by an operator.

One embodiment of the sequence engine 330 may choose from multiple command sequence templates to issue the commands. For instance, the sequence engine 330 may utilize a template to perform a Domain Name Server ("DNS") name test or another template to perform a connectivity test. Each template includes a specific sequence of commands that corresponds to one or more network scenarios. For example, one template may include commands that when executed, perform steps of the connectivity test. Another template may include commands that cover both the connectivity test and the DNS name test. In addition to the test steps, some commands may provide branching logic. In other words, these "branching" commands may cause the sequence engine 330 that utilizes one template to perform the connectivity test to switch to using another template to perform the DNS name test. These templates can be generated according to the operator's specifications, frequency of network scenario occurrences, examination of past error logs or defect reports, or other criteria. Similarly, one embodiment of the repair engine 350 also has several sequences of steps to choose from. For example, when the network notification test fails and if the repair engine 350 is invoked, the engine has the intelligence to choose the sequence of steps that configures the IP host. These sequences can be generated according to the operator's or the device manufacturer's specifications, or other criteria.

By using either "branching" commands in templates as discussed above or an internal branching logic of one embodiment of the sequence engine 330, the sequence engine 330 is able to use the results of prior tests to narrow down the potential causes for a network scenario to isolate the true causes. In one implementation, the sequence engine 330 may use the prior test results to execute new sets of commands without any human intervention. Alternatively, the sequence engine 330 may cause the prior test results and the corresponding potential causes to be displayed to an operator and permit the operator to manually, but efficiently, isolate the true causes.

An example embodiment of PSNMS 120 is easily modifiable, because its main functional elements are independent. Additional features can be added to PSNMS 120 without overhauling the overall system. For example, PSNMS 120 may support an additional network scenario and its corresponding sequences of commands and repair actions via plug-in software, new templates, or modification to the existing templates but without much modification to the existing software modules. Moreover, the PSNMS 120 is capable of detecting a change in network configuration. For instance, if a network device is removed from the network system 100, the data aggregation engine 310 detects the removal based on the lack of responses from the removed device. One embodiment of the data aggregation engine 310 relays the removal information to the sequence engine 330, which modifies its outgoing queries to reflect the change in an automated process.

2.2 Operation Flow

Figure 4A:
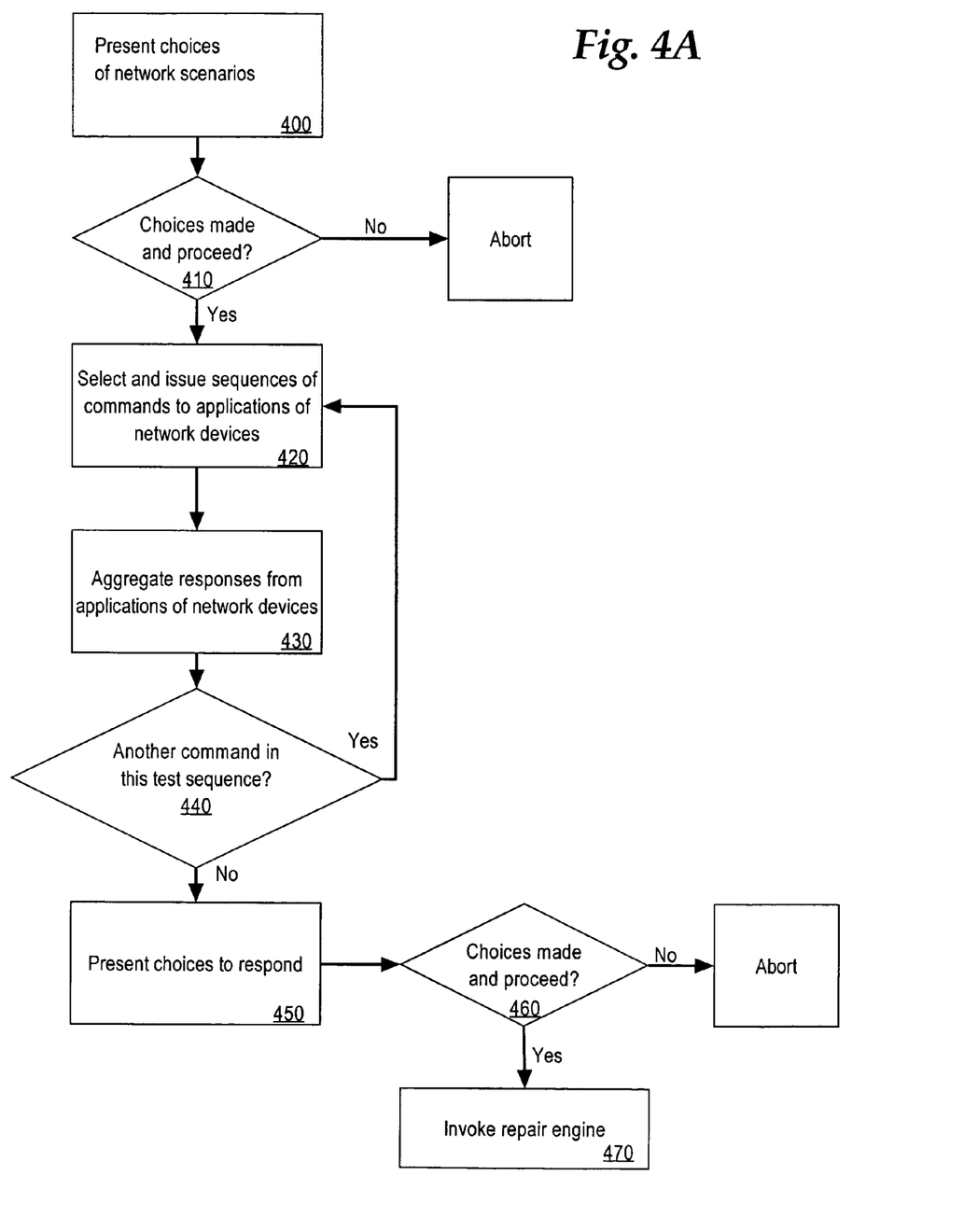
FIG. 4A is a flow chart of one process that an example method of diagnosing and repairing network devices based on scenarios follows.
Figure 4B:
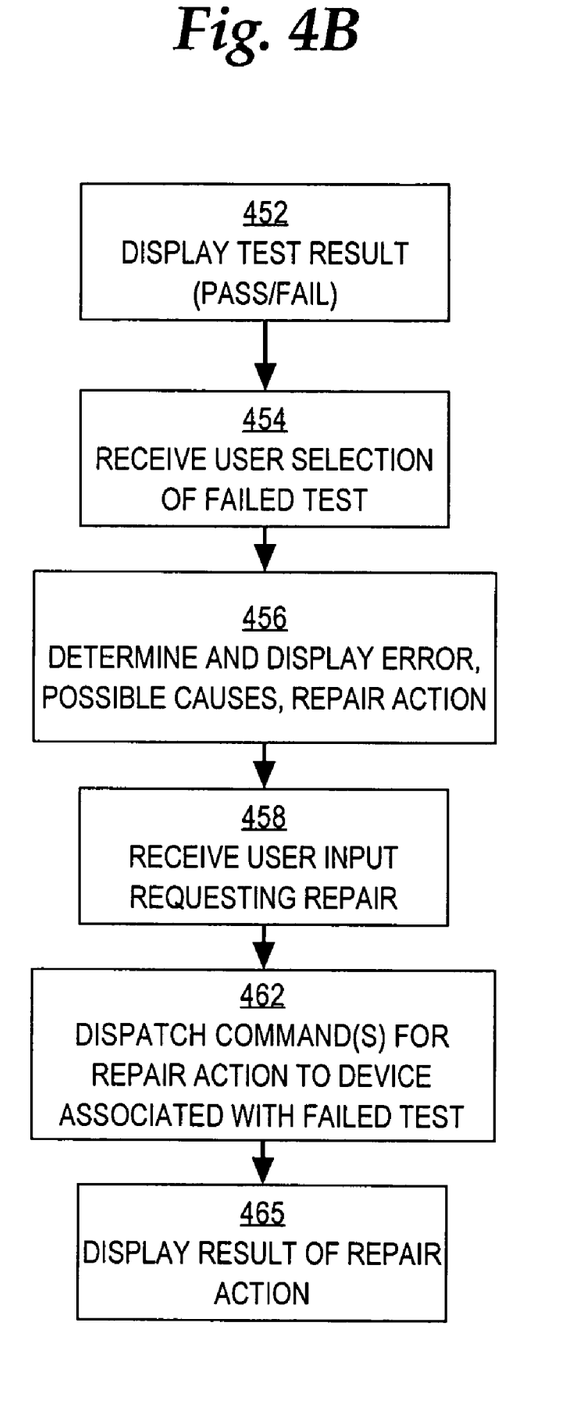
FIG. 4B is a flow chart of steps in another embodiment of the process of FIG. 4A.

FIG. 4A is a flow chart of one process that an example method of diagnosing and repairing network devices based on scenarios follows; FIG. 4B is a flow chart of steps in another embodiment of the process of FIG. 4A.

Referring first to FIG. 4A, assume for illustration purposes that an operator of the client computer 110 uses the PSNMS 120 that runs on the computer. In conjunction with FIG. 3, the user interface 300 provides the operator with choices of network scenarios to monitor in block 400. In one implementation, these choices are formulated based on the frequency of the network scenario occurrences, frequency of past selections made by the operator, or other criteria.

In block 410, the user interface 300 provides the operator an option to abort. However, if the operator chooses to proceed, the sequence engine 330 selects sequences of commands out of multiple sequence templates that correspond to the chosen network scenarios and issues the commands to various applications of network devices in block 420. It should be noted that these sequence templates could include decision branches that are based on the operator input, prior test results, and current step.

In one implementation, the sequence engine 330 obtains the network addresses of the network devices for issuing commands from the operator via the user interface 300. Also, the sequences of commands are specifically tailored to the various types of applications that run on the network devices. Thus, suppose command A is only recognizable by an application X of a network device Z, the operator explicitly provides the sequence engine 330 with the network address of the network device Z, and then the engine sends the commands A to the application X. Sequence engine 330 may also dynamically obtain the identification information of the network devices as well as the applications that run on the devices without exceeding the scope of the disclosed PSNMS 120.

In block 430, the data aggregation engine 310 aggregates and organizes responses from different applications and different network devices. In one implementation, the data aggregation engine 310 filters certain information out of the responses and places the responses in a certain order. Then the aggregation display engine 320 drives the user interface 300 to display the aggregated data.

In block 440, the sequence engine 330 determines whether another sequence of commands is needed to respond to the responses received in block 430. It is important to emphasize that the determination is made without the manual involvement of the operator in this embodiment of the PSNMS 120. If another sequence is needed, the sequence engine 330 chooses one out of the several sequence templates in block 420. Otherwise, the sequence engine 330 determines what the appropriate repair action is, and the results display engine 340 drives the user interface 300 to display both the description of the repair action and also some of the responses received in block 430 in block 450. In an alternatively embodiment, the decision branches are specified in the sequence templates, and the sequence engine 330 can follow the steps specified in the templates to carry out the aforementioned tasks (e.g., choosing steps to in response to test results and determining appropriate repair action).

If the operator chooses to carry out the repair actions in block 460, the user interface 300 invokes the repair engine 350 in block 470. Otherwise, the user aborts the repair operation.

Figure 5:
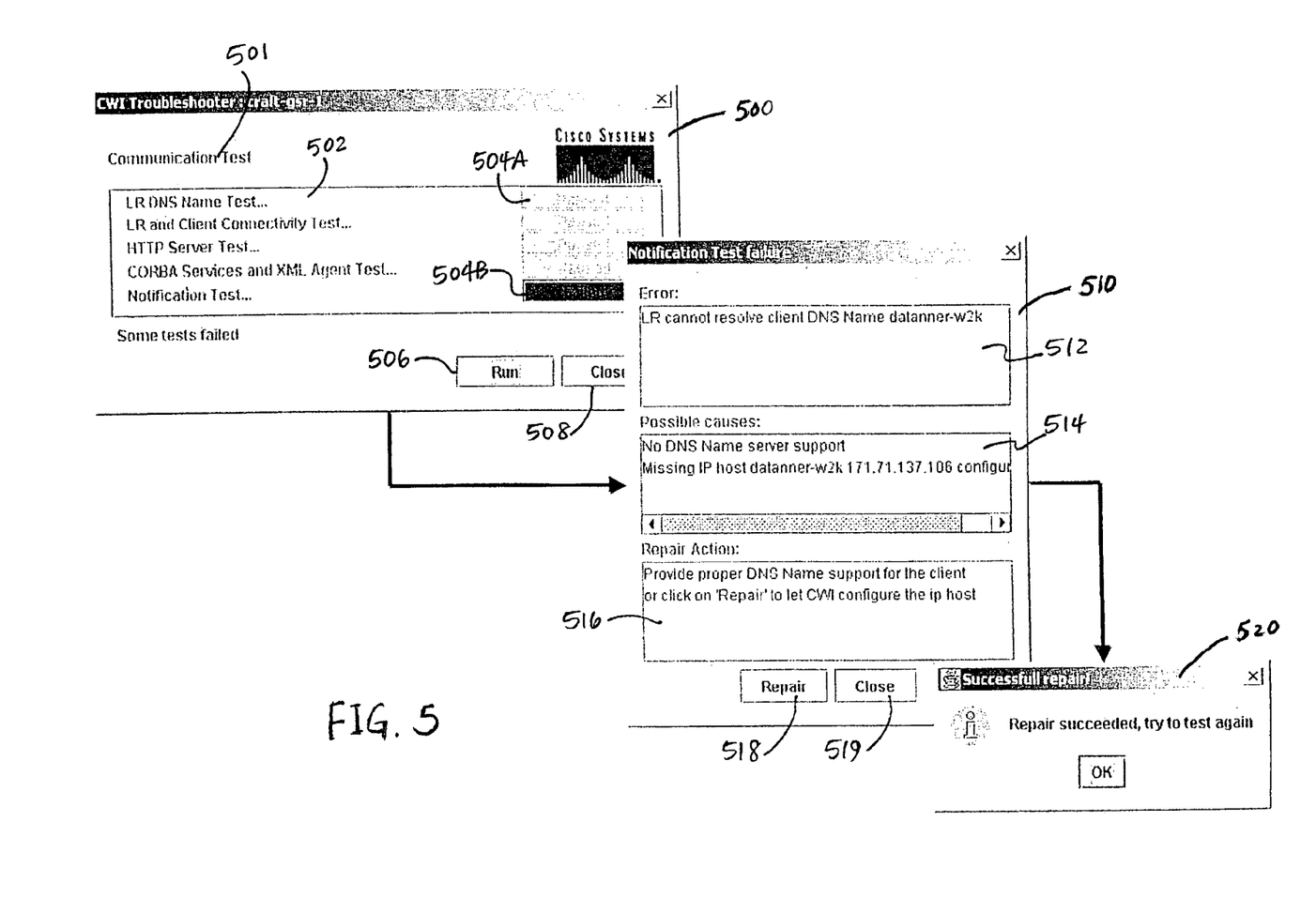
FIG. 5 illustrates screen displays that may be generated by one example session of operating a method of diagnosing and repairing network devices based on scenarios.

FIG. 5 illustrates screen displays that may be generated by one example session of operating a method of diagnosing and repairing network devices based on scenarios. Thus, FIG. 5 illustrates screen shots that the user interface 300 displays during one example session of operating the PSNMS 120. In this example, the network scenarios that the operator chooses to monitor are the communication tests shown in panel 500, namely, Router DNS Name Test, Router and Client Connectivity Test, HTTP Server Test, CORBA Services and XML Agent Test, and Notification Test.

If the operator chooses to proceed with these communication tests by selecting "Run", the sequence engine 330 issues sequences of commands that carry out the tests to applications of the network devices. The data aggregation engine 310 captures the test results and mergers them into a table of records, and the aggregation display engine 320 drives the user interface 300 to display the records. Also, the aggregation engine 320 and the results display engine 340 drive the user interface 300 to display the panel 510 that includes the identified error, the possible cause of the error, and the suggested repair action.

If the operator chooses to proceed with the repair action by selecting "Repair" in panel 510, the repair engine 350 is invoked. Panel 520 indicates that the repair action has taken place successfully. It should be noted that the screen shots shown in FIG. 5 are for illustration purposes only, and many other display configurations or windows can be deployed without exceeding the scope of the disclosed PSNMS 120.

Referring now to FIG. 4B and FIG. 5, in one embodiment, block 450 involves displaying a test result in block 452. For example, a description of each test is shown in list 502 of panel 500 and pass/fail results 504A, 504B are displayed in panel 500. In the illustrated example, the "Router DNS Name Test" resulted in a Passed result 504A, and the "Notification Test" resulted in a "Failed" result 504B. Label 501 indicates that the then-current test scenario is "Communication Test," which includes all the listed tests. An operator may initiate all tests in the scenario by selecting Run button 506. An operator may close panel 500 by selecting Close button 508.

In an embodiment, each "Failed" result such as 504B is a GUI widget, such as a button, and selecting the button causes the system to display an associated error, possible causes, and repair actions. Thus, in block 454 of FIG. 4B, a user selection of a failed test is received, e.g., by selecting "Failed" result 504B of panel 500. In response, as indicated in block 456, the system determines and displays an associated error, possible causes, and repair action. For example, panel 510 is displayed and includes an error listing 512, possible causes listing 514, and repair action listing 516.

In block 458, user input requesting a repair is received. For example, an operator may request the system to automatically perform the repair(s) identified in repair action listing 516 by selecting Repair button 518. An operator may close panel 510 by selecting Close button 519. In response to the user input received at block 458, one or more commands are dispatched to the device associated with the failed test, for performing the repair action, as indicated in block 462. Alternatively, one or more commands are sent to multiple devices, as required to perform the indicated repair action.

In block 465, a result of the repair action is displayed. For example, panel 520 of FIG. 5 is displayed. If the repair action was successful, as indicated in panel 520, optionally, a user may verify that the repair action succeeded by selecting Run button 506 of panel 500 again.

3.0 EXTENSIONS AND ALTERNATIVES

In the foregoing specification, the PSNMS 120 has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for diagnosing and repairing network devices on a network, wherein the method is performed by a network management system located on a client computer, comprising:

communicating with and managing a plurality of network devices, each of the network devices having at least one application located therein;

the network management system maintaining and updating a plurality of queries that communicate with the applications associated with the one or more network devices;

the network management system selecting one or more of the plurality of queries to be performed on one or more of the network devices;

the network management system automatically, without user intervention, detecting modifications to the network and automatically, without user intervention, modifying the selected queries to match the modifications to the network;

the network management system performing the selected queries on one or more of the network devices;

the network management system receiving and aggregating responses to the selected queries, wherein the responses are received from the plurality of applications on the network devices;

the network management system receiving responses to the selected queries and automatically evaluating the responses to formulate corrective actions, wherein the corrective actions cause automatically repairing failures of one or more of the network devices.

2. The method of claim 1, wherein the selected queries reflect a plurality of potential scenarios within the network, wherein said network scenarios further comprise at least one of a sequence of tests to be performed; data aggregation results; communication test results; network errors; possible causes of network errors; suggested repair actions, and results of repairs that have been performed.

3. The method as recited in claim 2, wherein each of the selected queries corresponds to at least one of the plurality of scenarios.

4. The method as recited in claim 3, further comprising issuing the selected queries to the applications in an automatically established sequence.

5. The method of claim 1, wherein the applications comprise command parsers, utility programs, and device agents.

6. The method of claim 1, further comprising a user interface, located within and working in conjunction with the network management system, displaying information related to network scenarios.

7. The method as recited in claim 6, further comprising the user interface having an option to customize the selected queries, the plurality of the scenarios, and the corrective actions.

8. The method of claim 1, wherein the step of aggregating responses further comprises filtering the responses to the selected queries according to a predetermined template of a plurality of templates; organizing the responses to the selected queries in a format that conforms to a format of the specific predetermined template.

9. The method as recited in claim 5, further comprising generating the predetermined template according to one or more of an operator's specifications, patterns of past retrieved data, or configurations of the network.

10. The method as recited in claim 1, wherein the step of aggregating responses further comprises retrieving specific types of data from distinct applications of differing network devices.

11. The method as recited in claim 6, wherein detecting modifications to the network is not done automatically, but is performed at the user's request through the user interface.

12. The method as recited in claim 6, wherein modifying the selected queries to match the modifications to the network is performed at a user's request through the user interface.

13. The method as recited in claim 6, wherein evaluating the responses to formulate corrective actions is performed at a user's request through the user interface.

14. The method as recited in claim 6, wherein repairing failures is performed at a user's request through the user interface.

15. The method as recited in claim 1, wherein automatically repairing failures comprises resetting one or more of the network devices.

16. The method as recited in claim 1, wherein automatically repairing failures comprises restarting one or more of the network devices.

17. The method as recited in claim 1, wherein automatically repairing failures comprises performing a configuration command or operation on one or more of the network devices.

18. The method as recited in claim 1, wherein automatically repairing failures comprises executing a script on one or more of the network devices.

19. A computer-readable volatile or non-volatile storage medium storing one or more sequences of instructions for managing a plurality of network devices on a network, which instructions, when executed by one or more processors of a network management system located on a client computer, cause:

communicating with and managing a plurality of network devices, each network device having at least one application located therein;
   the network management system maintaining and updating a plurality of selected queries, wherein the selected queries communicate with the applications associated with the one or more network devices;
   the network management system selecting one or more of the plurality of selected queries to be performed on one or more of the network devices;
   the network management system automatically, without user intervention, detecting modifications to the network and automatically, without user intervention, modifying the selected queries to match the modifications;
   the network management system performing the selected queries on one or more of the network devices;
   the network management system receiving and aggregating responses to the selected queries, wherein the responses are received from the plurality of applications on the network devices;
   the network management system receiving responses to the selected queries and automatically evaluating the responses to formulate corrective actions, wherein the corrective actions automatically repairing failures of one or more of the network devices.

20. An apparatus for managing a plurality of network devices on a network, comprising:

one or more processors;
   means for communicating with and managing a plurality of network devices, each network device having at least one application located therein;
   means for maintaining and updating a plurality of queries, wherein the queries communicate with the applications associated with the one or more network devices;
   means for selecting one or more of the plurality of queries to be performed on one or more of the network devices;
   means for automatically, without user intervention, detecting modifications to the network and automatically, without user intervention, modifying the selected queries to match the modifications;
   means for performing the selected queries on one or more of the network devices;
   means for receiving and aggregating responses to the selected queries, wherein the responses are received from the plurality of applications on the network devices;
   means for receiving responses to the selected queries and automatically evaluating the responses to formulate corrective actions, wherein the corrective actions cause automatically repairing failures of one or more of the network devices.

21. The computer-readable volatile or non-volatile storage medium of claim 19, wherein the selected queries reflect a plurality of potential scenarios within the network, wherein said network scenarios further comprise at least one of a sequence of tests to be performed; data aggregation results; communication test results; network errors; possible causes of network errors; suggested repair actions, and results of repairs that have been performed.

22. The computer-readable volatile or non-volatile storage medium of claim 19, wherein the applications comprise command parsers, utility programs, and device agents.

23. The computer-readable volatile or non-volatile storage medium of claim 19, wherein the instructions which cause aggregating responses further comprise instructions which cause filtering the responses to the selected queries according to a predetermined template of a plurality of templates; organizing the responses to the selected queries in a format that conforms to a format of the specific predetermined template.

24. The computer-readable volatile or non-volatile storage medium of claim 19, wherein the instructions which cause aggregating responses further comprise instructions which cause retrieving specific types of data from distinct applications of differing network devices.

25. The computer-readable volatile or non-volatile storage medium of claim 19, wherein the instructions which cause automatically repairing failures comprise instructions which cause performing a configuration command or operation on one or more of the network devices.

26. The apparatus of claim 20, wherein the selected queries reflect a plurality of potential scenarios within the network, wherein said network scenarios further comprise at least one of a sequence of tests to be performed; data aggregation results; communication test results; network errors; possible causes of network errors; suggested repair actions, and results of repairs that have been performed.

27. The apparatus of claim 20, wherein the applications comprise command parsers, utility programs, and device agents.

28. The apparatus of claim 20, wherein the means for aggregating responses further comprises means for filtering the responses to the selected queries according to a predetermined template of a plurality of templates; means for organizing the responses to the selected queries in a format that conforms to a format of the specific predetermined template.

29. The apparatus as recited in claim 20, wherein the means for aggregating responses further comprises means for retrieving specific types of data from distinct applications of differing network devices.

30. The apparatus as recited in claim 20, wherein the means for automatically repairing failures comprises means for performing a configuration command or operation on one or more of the network devices.

* * * * *

UNITED STATES PATENT AND TRADEMARK OFFICE
CERTIFICATE OF CORRECTION

PATENT NO. : 7,620,848 B1  Page 1 of 1
APPLICATION NO. : 10/723929
DATED : November 17, 2009
INVENTOR(S) : David Tanner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Fourteenth Day of December, 2010

David J. Kappos
*Director of the United States Patent and Trademark Office*